United States Patent [19]
Wolfe et al.

[11] Patent Number: 5,472,748
[45] Date of Patent: Dec. 5, 1995

[54] PERMANENT LASER CONDITIONING OF THIN FILM OPTICAL MATERIALS

[75] Inventors: C. Robert Wolfe, Palo Alto; Mark R. Kozlowski, Pleasanton; John H. Campbell, Livermore; Michael Staggs, Tracy; Frank Rainer, Livermore, all of Calif.

[73] Assignee: The United States of America as represented by the United States Department of Energy, Washington, D.C.

[21] Appl. No.: 597,228

[22] Filed: Oct. 15, 1990

[51] Int. Cl.[6] ................... B05D 3/06; B05D 5/06
[52] U.S. Cl. .......... 427/554; 427/559; 427/557; 427/163.1; 427/164; 427/165; 427/166; 427/167; 427/163.4
[58] Field of Search ............ 427/53.1, 42, 160, 427/162, 163, 164, 165, 166, 167, 168, 169, 554, 555, 557, 558, 559, 163.1, 163.4

[56] References Cited

U.S. PATENT DOCUMENTS

| | | | |
|---|---|---|---|
| 3,953,652 | 4/1976 | Addiss, Jr. et al. | 427/42 |
| 4,370,175 | 1/1983 | Levatter | 427/53.1 |
| 4,375,312 | 3/1983 | Tangnan | 427/163 |
| 4,434,191 | 2/1984 | Cook et al. | 427/165 |
| 4,545,646 | 10/1985 | Chern et al. | 427/53.1 |
| 4,560,576 | 12/1985 | Lewis et al. | 427/53.1 |
| 4,659,588 | 4/1987 | Yamada et al. | 427/42 |
| 4,693,910 | 9/1987 | Nakajima et al. | 427/168 |
| 4,732,783 | 3/1988 | Choe et al. | 427/165 |
| 5,009,485 | 4/1991 | Hall | 427/165 |

OTHER PUBLICATIONS

Frink et al, "Temporary Laser Damage Threshold Enhancement by Laser Conditioning of Antireflection–Coated Glass", Appl. Phys. Lett. 51 (6) 10 Aug. 1987 pp. 415–416.
Stewart et al, "The Properties of Laser Annealed Dielectric Films", Nat. Inst. Stand. & Tech. (US) Spec. Pub. 756, Oct. 1987 pp. 369–386.
Swain et al, "The Effect of Bkaing & Pulsed Laser Irradiation on the Bulk laser Damage Threshold of KDP Crystals", Appl. Phys. Lett. 41 (1) Jul. 1, 1982 pp. 12 to 14.
Arenberg et al, "Experimental Investigation of the Role of Wavelength in the Laser Conditioning Effect", Nat. Inst. Stand. & Tech. (US.) Spec Pub 756, Oct. 1987 pp. 516–518.
Swain et al, "Raising the Surface Damage Threshold of Neutral Solution Processed BK–7 by Pulsed Laser Irradiation", Nat. Bur. Stand. (US.) Spec Pub. 669 Nov. 1982, pp. 292–294.
Wilder et al, "Effect of Non1 Laser Treatment on Damage Threshold of Selected Optical Coatings", Nat. Inst. Stand. & Tech. (US.) Spec. Pub. 775, Oct. 1988, pp. 259–264.

Primary Examiner—Marianne Padgett
Attorney, Agent, or Firm—William C. Daubenspeck; L. E. Carnahan; William R. Moser

[57] ABSTRACT

The invention comprises a method for producing optical thin films with a high laser damage threshold and the resulting thin films. The laser damage threshold of the thin films is permanently increased by irradiating the thin films with a fluence below an unconditioned laser damage threshold.

7 Claims, 5 Drawing Sheets

PERMANENT LASER CONDITIONING OF THIN FILM OPTICAL MATERIALS

The U.S. Government has rights to this invention pursuant to Contract No. W-7405-ENG-48 between the U.S. Department of Energy and the University of Calif., for the operation of Lawrence Livermore National Laboratory.

BACKGROUND OF THE INVENTION

This invention relates to a method for permanently increasing the laser induced damage threshold of optical thin films.

The performance of high peak power lasers, such as those used for fusion research and materials processing, is often limited by the damage threshold of optical components that comprise the laser chain. In particular, optical thin films generally have lower damage thresholds than bulk optical materials, and therefore thin films limit the output performance of these laser systems. Optical thin films are used as high reflectors, polarizers, beam splitters and anti-reflection coatings.

The Nova project at Lawrence Livermore National Laboratory is designed to study the use of lasers to produce fusion by inertial confinement. The 1.06 μm wavelength Nova laser output is limited, in part, by the damage threshold of large aperture (approximately 1 m diameter) dielectric thin films coated on flat substrates. Proposed future fusion lasers require optical coatings with laser induced damage thresholds that exceed a fluence of 35 $J/cm^2$ in 10 ns pulses at the 1.06 μm wavelength. Fluence is defined in the specification and claims for a pulsed laser of a specified wavelength and specified pulse length as the energy per unit area delivered by a single pulse. Prior to the invention, the highest damage thresholds were in the range from 10–20 $J/cm^2$ in a 10 ns pulse at the 1.06 μm wavelength. Therefore, a method of increasing the laser damage threshold of dielectric optical thin films (or coatings) is needed.

Several researchers have previously reported that the damage thresholds of some optical materials could be increased by first illuminating the optical materials with sub-threshold fluences of laser light. Some such examples are: Swain, J. E.,Lowdermilk, W. H., Milam, D, "Raising the Surface Damage Threshold of Neutral Solution Processed BK-7 by Pulse Laser Irradiation," Nat. Bur. Stand. (US) Spec. Pub. 669, 1982 November 292 p.; Frink, M.E., Arenberg, J. W., Mordaunt, D. W., Seitel, S. C., Babb, M. T., Teppo E. A., "Temporary Laser Damage Threshold Enhancement By Laser Conditioning of Antireflection-Coated Glass," Appl. Phys. Lett. 51, 1987, 415 p.; Arenberg, J. W., Mordaunt, D. W., "Experimental Investigation on the Role of Wavelength in the Laser Conditioning Effect," Nat. Inst. Stand. & Tech. (US) Spec. Pub 756, 1987 October 369 p.; Wilder, J. G., Thomas, I. M., "Effect of n on 1 Laser Treatment on Damage Threshold of Selected Optical Coatings," Nat. Inst. Stand. & Tech. (US) Spec. Pub. 775, 1988 October, 259 p.; Stewart, A. F., Guenther, A. H., Domann, F. E., "The Properties of Laser Annealed Dielectric Films," Nat. Inst. Stand. & Tech. (US) Spec. Pub. 756, 1987 October, 369 p.; and Swain, J. E., Stokowski, S. E., Milam, D., Kennedy, G., "The Effect of Baking and Pulsed Laser Irradiation on the Bulk Laser Damage Threshold of Potassium Dihydrogen Phosphate Crystals," Appl. Phys. Lett. 41 (1982) 12. Increases in damage threshold of a factor of three have been reported. This laser conditioning effect has not been put to practical use however, for several reasons:

a) Early studies indicated that laser conditioning has only a temporary effect; damage thresholds could only be improved for a few hours or days.

b) The relative importance of film parameters (such as design, materials and deposition method) on conditioning was not known.

c) The laser conditioning was sometimes achieved using illumination at wavelengths different than the wavelength that the optics were intended for. Therefore, an additional laser system was required for conditioning.

d) Methods for conditioning large aperture optics had not been addressed.

SUMMARY OF THE INVENTION

It is the object of this invention to permanently increase the laser damage threshold of dielectric optical thin film coatings.

It is another object of the invention to provide an optical thin film or coating with a high laser damage threshold.

It is another object of the invention to provide a method and apparatus for increasing the laser damage threshold of a coating on an optical device with a large aperture.

It is another object of the invention to permanently increase the laser damage threshold fluence of an optical coating by at least a factor of two.

It is another object of the invention to provide a method and apparatus for increasing the laser damage threshold of an optical coating in-situ.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

The invention is a process to laser condition optical thin film coatings using sub-threshold illumination of substantially the same wavelength as the wavelength of the laser fluence for which the optical coating is being conditioned. The coatings may be conditioned "in-situ", that is conditioned in the device in which the component will later be used. Increases in the damage threshold of 2 to 3 times have been obtained. The increase in damage threshold is permanent. Large aperture, practical optics may be conditioned over the entire clear aperture.

The damage threshold is defined as the lowest fluence which causes either a light flash at the coating surface or a visible change in the surface properties or both, as determined for example by microscopic visual observation or the sensitive "breath test." The breath test relies on water vapor condensation patterns to identify damage areas. Microscopic visual observation of the damage threshold may also be measured using ×100 Nomarski microscopy to observe surface modification accompanying damage.

The present invention provides at least two methods for applying the laser to the surface:

1. Rastering the surface using a small area laser beam.

2. Illuminating the entire clear aperture at once using a large aperture laser beam.

The actual increase in threshold produced by laser conditioning appears to be dependent upon the illumination program (i.e., the number of pulses, repetition rate and fluence). The highest damage thresholds have been achieved using multiple pulses of increasing fluence with small increases in fluence between pulses and short times between pulses.

Based on experimental results, it is believed that the laser conditioning effect (permanent increase in damage threshold) is the result of eliminating light absorbing defects within the dielectric material. These defects serve as a source of heat generation that promote the process involved in laser damage. These defects are present as a result of the nature of the deposition process. It is believed that they can be eliminated as light absorbing regions by sub-threshold illumination according to the present invention. When the light absorbing defects are eliminated photo-generated heat cannot be produced. Since the laser conditioning eliminates the light absorbing defect, the effect is permanent.

DETAILED DESCRIPTION OF THE EMBODIMENTS OF THE INVENTION

Figure 1:
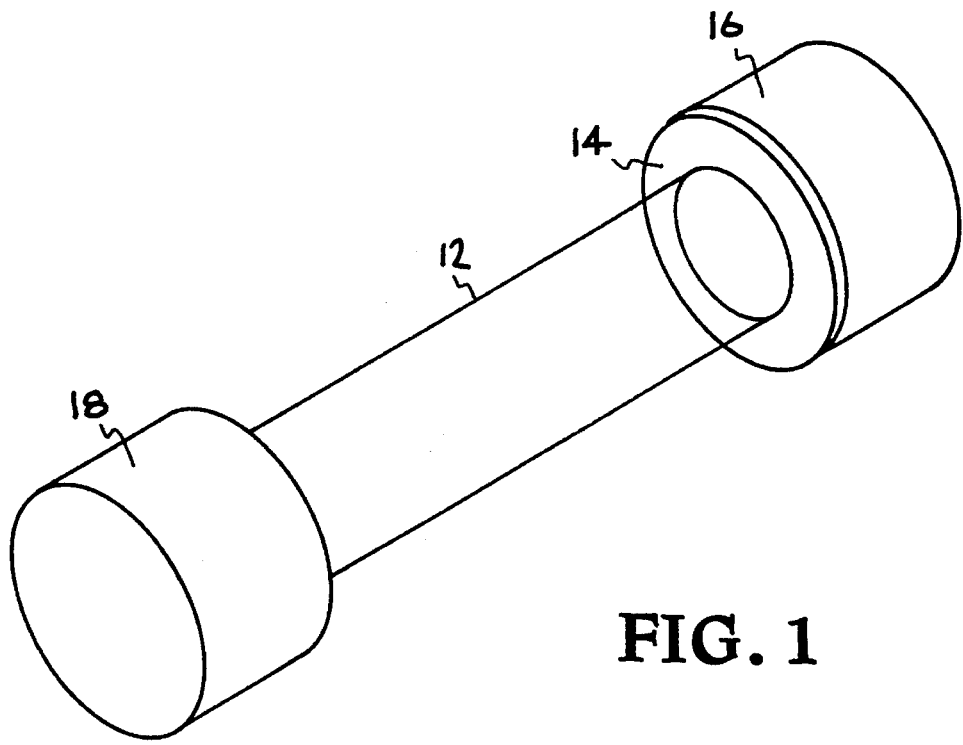
FIG. 1 is an illustration of an apparatus used for in-situ full aperture conditioning of optical coatings on glass substrates.
Figure 2:
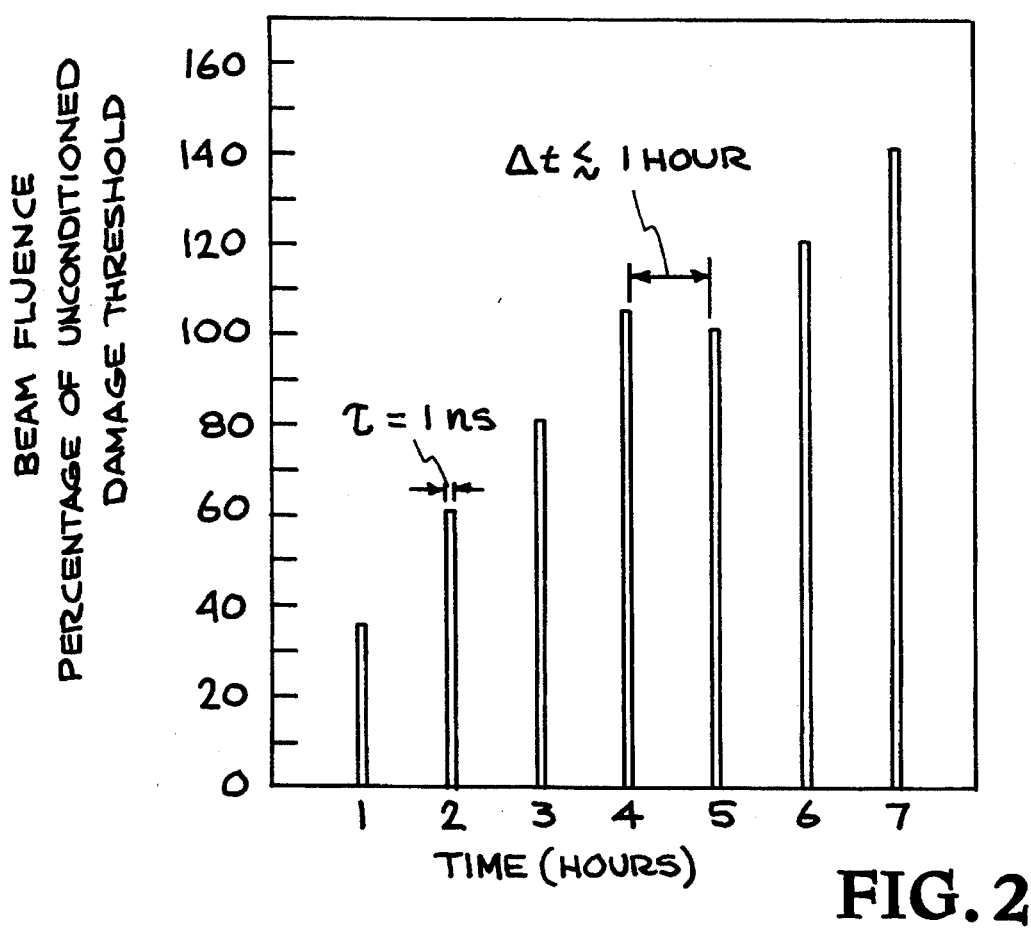
FIG. 2 is a graph illustrating an illumination program used in the embodiment of the invention illustrated in FIG. 1.

FIG. 1 illustrates an embodiment of the invention. In FIG. 1 a laser beam 12 from a laser source 18 was used to illuminate an optical component consisting of a dielectric multilayer coating 14 deposited by e-beam deposition on a glass substrate 16. In this embodiment the optical film 14 was made of $HfO_2/SiO_2$. The thin film had an initial unconditioned damage threshold at 1064 nm wavelength of 7 $J/cm^2$ for 1 ns pulses. The inventive process consisted of illuminating the entire surface of the 2-inch diameter coating with a series of 1 ns, 1064 nm laser pulses. The illumination program is shown in FIG. 2. A series of seven shots with fluences increasing from 3.5 to 12 $J/cm^2$ resulted in no damage to the optical coating. Because of limitations on the laser, the repetition rate was one irradiation in a little less than an hour. The laser provided one irradiation at each fluence level shown in FIG. 2. A first irradiation had a fluence of approximately 40% of the unconditioned damage threshold. A second irradiation had a fluence between 50% and 85% of the unconditioned damage threshold. A third irradiation had a fluence between 75% and 100% of the unconditioned damage threshold. A fourth, a fifth and a sixth irradiation had fluences between 100% and 140% of the unconditioned damage threshold. A seventh irradiation had a fluence of approximately equal to or greater than 140%. The illumination at sub-threshold fluences, i.e., the inventive process, had increased the damage threshold for a 1 ns irradiation by at least a factor of 1.7. Prior to the inventive process the damage threshold of the coating for a 10 ns irradiation of a 1064 nm wavelength was 16 $J/cm^2$. After the full aperture conditioning the permanent damage threshold for a 10 ns irradiation of a 1064 nm wavelength was greater than 32 $J/cm^2$. This embodiment may be used as an in-situ process.

Figure 3:
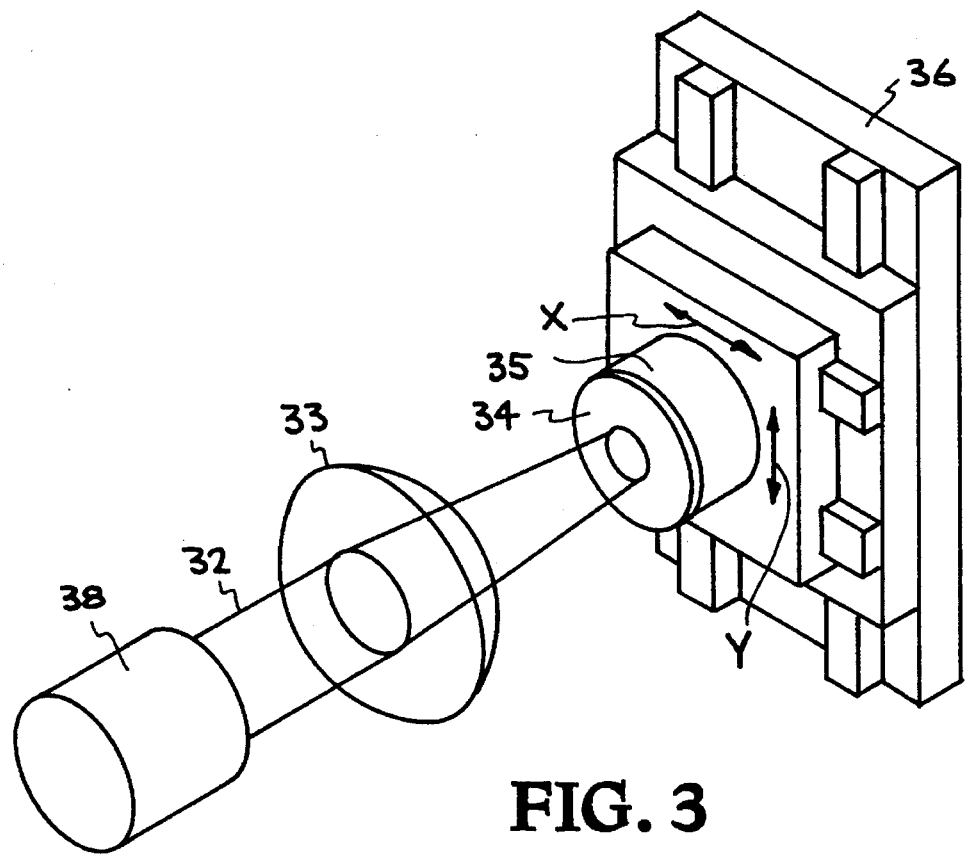
FIG. 3 is an illustration of an apparatus used to condition the optical coating of a large aperture mirror by rastering with a small beam.

FIG. 3 illustrates another embodiment of the invention. In this embodiment a test laser source 38 provided a 1064 nm laser beam 32 with a irradiation length of 8 ns and a repetition rate of 18 Hz. The beam passed through a focusing lens 33 to a mirror 35 with a multilayer dielectric optical coating 34 made of $HfO_2/SiO_2$. The focusing lens 33 allowed the fluence of the output of the test laser 38 to be low at the laser 38, thus preventing optical damage to the components of the test laser 38, and allowed the laser beam 32 to be focused to a fluence between 50% and 85% of the unconditioned damage threshold of the optical film at the surface of the optical film. The mirror 35 was mounted on an x-y stage 36 which served as the rastering means. The x-y stage could be any type of device which physically moves the mirror 35 along the x-y plane to allow all portions of the mirror 35 to be exposed to the beam. Before the inventive conditioning process was used the optical thin film had an initial damage threshold fluence of 16 $J/cm^2$ for a 8 ns irradiation. For this embodiment, the x-y stage velocity was chosen such that the sample was shot every 0.1 mm in both the x and y directions. This scan rate resulted in overlapping shots for the 1 mm diameter focused laser beam. Overlapping shots guaranteed complete illumination of the area to be rastered. The laser fluence was chosen to be between 50% and 85% of the unconditioned damage threshold. The 85% upper limit was chosen so as to avoid the possibility of illuminating the sample with a fluence above the damage threshold during conditioning as a result of inaccuracies in the 0 measurement of the unconditioned damage threshold or the conditioning laser fluence. For this embodiment, the optical film was rastered with a conditioning laser fluence of 55% of the unconditioned damage threshold, i.e., about 9 $J/cm^2$ at 1064 nm for a 8 ns irradiation. After the inventive process was completed, the optical thin film had a permanent conditioned damage threshold of 39 $J/cm^2$ for a irradiation length of 8 ns at 1064 nm. This embodiment is in general an ex-situ process.

In this embodiment of the invention the laser source 38 provided a beam 32 with a nearly flat spatial intensity distribution. This allowed a uniform conditioning of the optical thin film 34.

Figure 4:
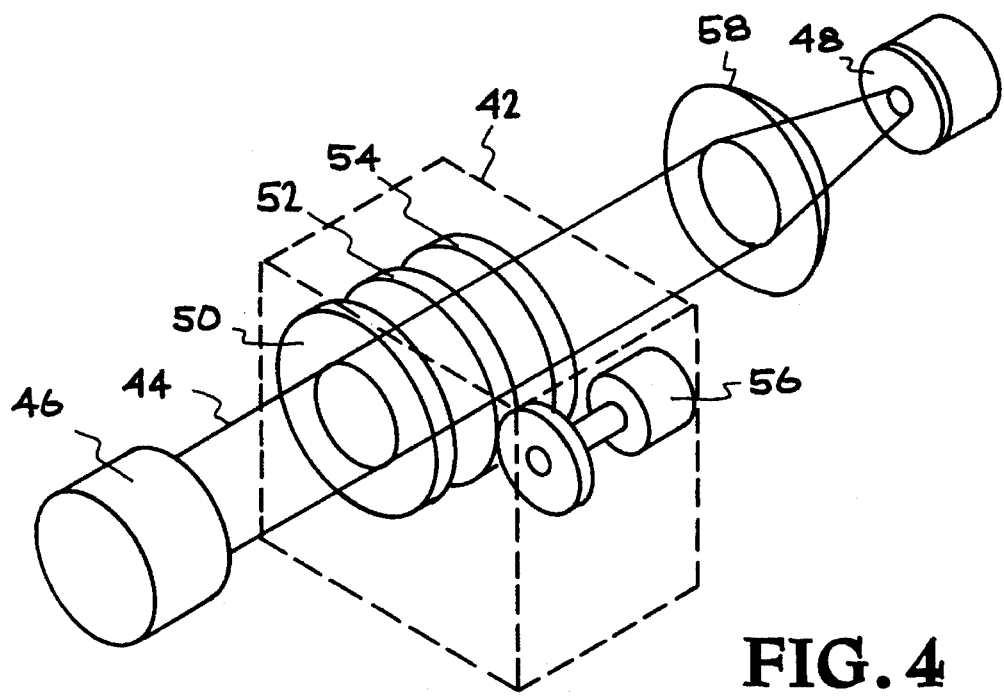
FIG. 4 is an illustration of an apparatus used in ramp conditioning of optical coatings.
Figure 5:
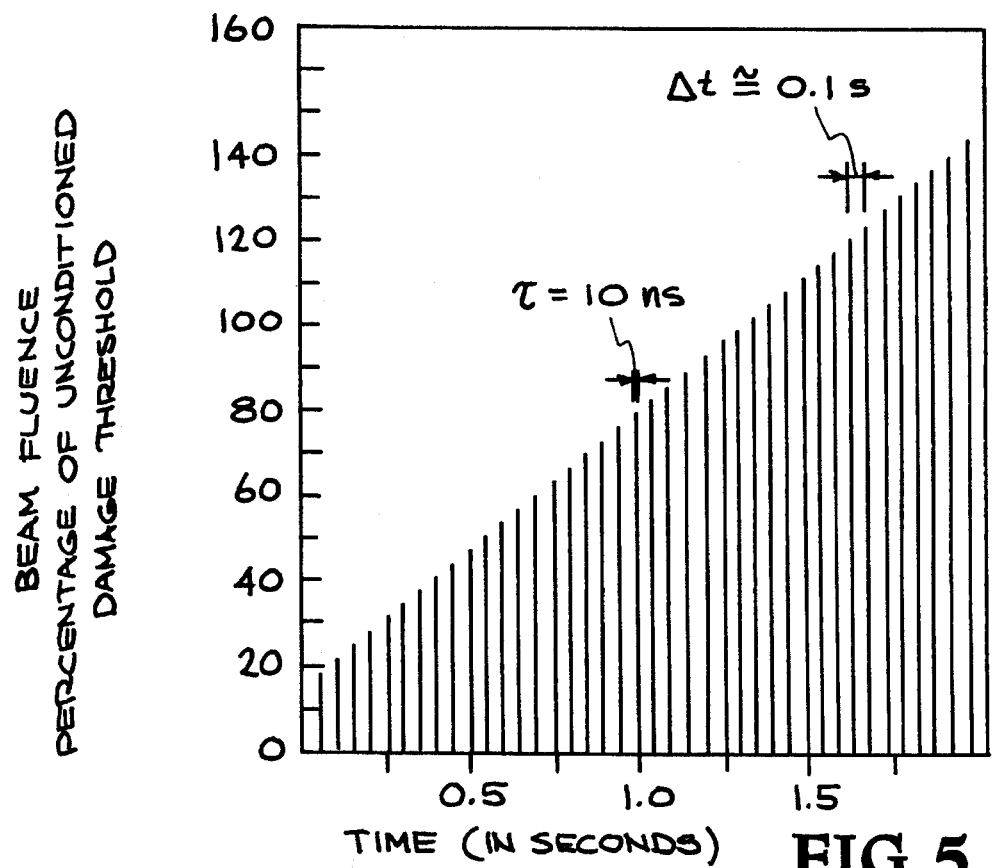
FIG. 5 is a graph illustrating the ramping of fluence used in the embodiment of this invention illustrated in FIG. 4.

FIG. 4 illustrates another embodiment of the invention. The apparatus in this embodiment is similar to that of FIG. 1 except that a ramp attenuator 42 and a lens 58 are added in the beam path 44 between the laser 46 and the dielectric film 48. As shown in FIG. 5, instead of increasing the fluence in a series of large steps or by using a single fluence, the fluence was increased by varying the attenuation in a ramp-like fashion with many small steps having an increase in the fluence of approximately 0.05% of the unconditioned (or initial) damage threshold per step. The time between irradiation step was 0.1 s as the fluence was increased between steps. The fluence at the surface of the film in this embodiment was ramped from less than 20% of the initial damage threshold to approximately 150% of the initial damage threshold In this embodiment a dielectric film 48 of a single layer SiO₂ evanescent wave coating had an unconditioned damage threshold of 12 J/cm² for a 10 ns pulse with a wavelength of 1064 nm. After ramp conditioning with 10 ns irradiations the damage threshold of the film was 35 J/cm². In an embodiment using the same technique for a 10 ns pulse with a wavelength of 355 nm, the unconditioned damage threshold was 6.2 J/cm². After ramp conditioning with 10 ns irradiations at a wavelength of 355 nm the damage threshold of the film was 12.4 J/cm². It should be noted that in all cases examined, ramp conditioning provided a larger increase in damage threshold than did single fluence or large step conditioning methods described above.

There are many optical devices that could be used to provide ramp attenuation. In this embodiment a first polarizer 50, a half waveplate 52, and a second polarizer 54 are used to provide ramp attenuation. As the beam 44 passes through the first polarizer 50 the beam is linearly polarized. The halfwave plate 52 rotates the polarization by twice the angle of the halfwave plate rotation. The 0 second polarizer 54 attenuates part of the laser beam 44 according to the alignment of the resulting polarization and the second polarizer 54. A motor 56 is used to slowly and continuously rotate the half waveplate 52 to provide the desired ramp attenuation. The laser beam 44 between the laser 46 and the lens 58 has a low fluence to prevent damage to any optical element between the laser 46 and the focusing lens 58 inclusive. The focusing lens 58 focuses the low fluence laser beam 44 to a fluence at the surface of the dielectric film 48 that without attenuation from the ramp attenuator 42 would be higher than the unconditioned damage threshold.

Figure 6:
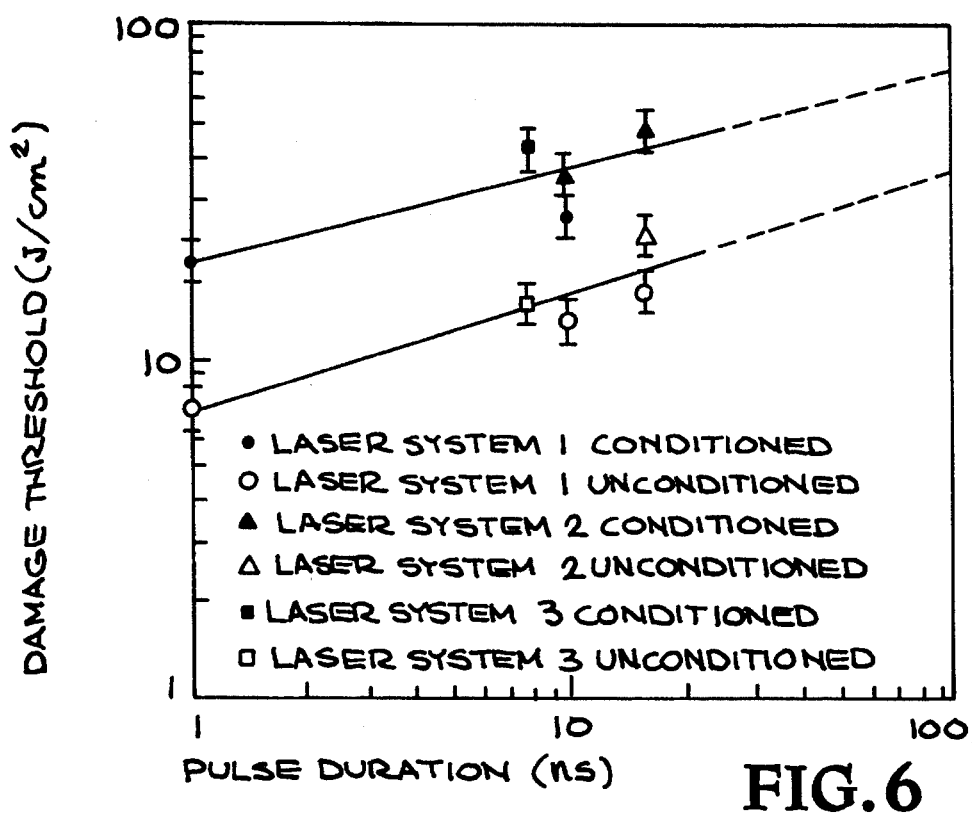
FIG. 6 is a graph of laser damage threshold versus pulse length for an optical thin film of $HfO_2/SiO_2$ designed to be highly reflective at 1064 nm.

The improvement in the laser damage threshold achieved by the invention is observed for various laser irradiation lengths as shown in FIG. 6. FIG. 6 is a graph of pulse length duration versus damage threshold for three different laser systems operated at 1064 nm. FIG. 6 illustrates how the laser damage threshold was increased for all three systems at different pulse lengths.

Figure 7:
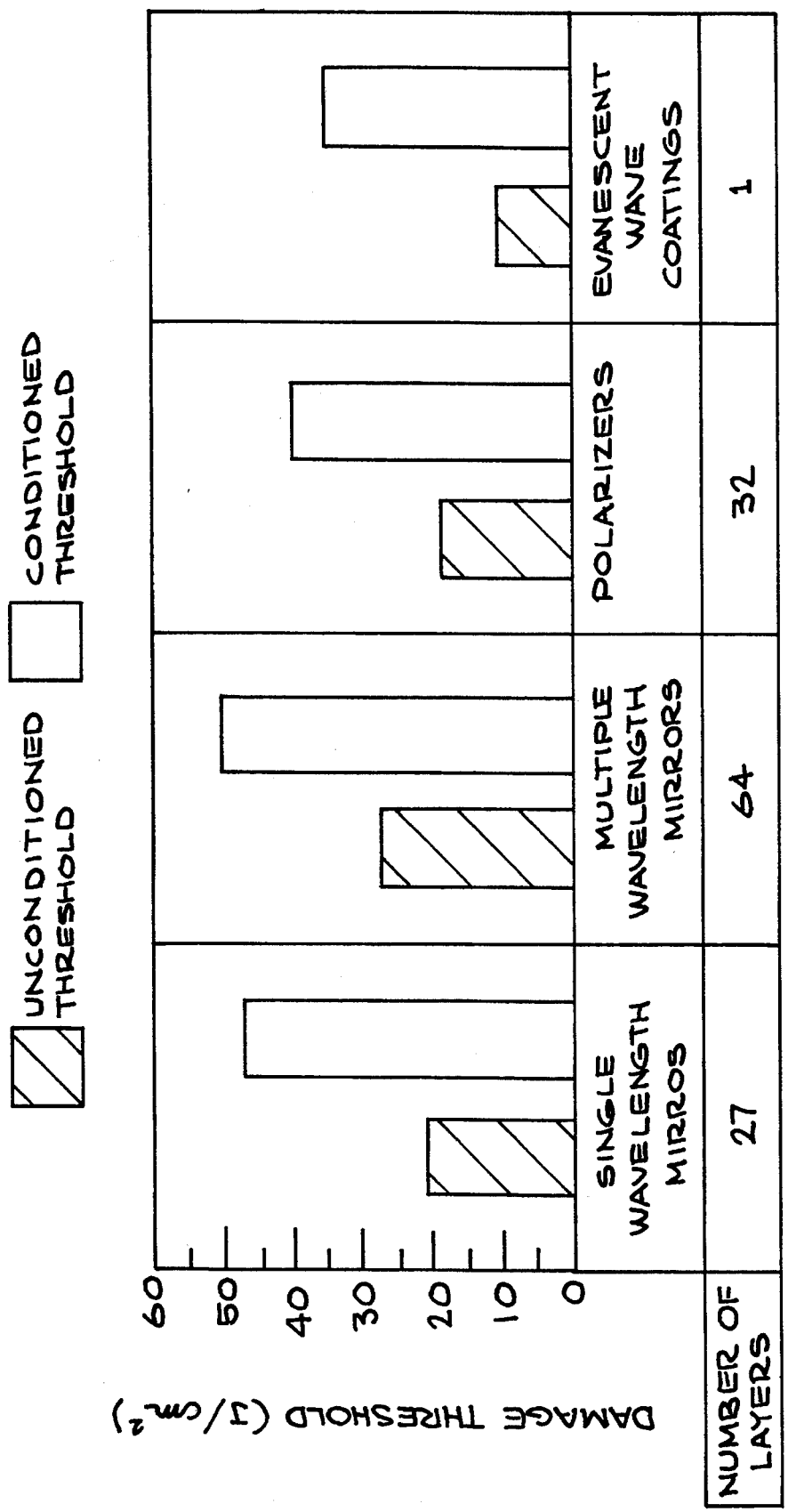
FIG. 7 is a graph comparing the laser damage thresholds of unconditioned coatings and conditioned coatings used for various optical purposes with various numbers of layers.

As shown in FIG. 7, other single or multiple dielectric optical film designs can be conditioned by the inventive process to improve their damage threshold. Various number of designs, such as multilayer polarizers and single layer evanescent wave coatings, may be conditioned. FIG. 7 compares the laser damage thresholds of various conditioned and unconditioned coatings.

The inventive method may be preformed using various wavelengths. The inventive process uses for conditioning the thin film a laser beam of a wavelength approximately equal to the wavelength of the beam for which the optical thin film was designed.

Figure 8:
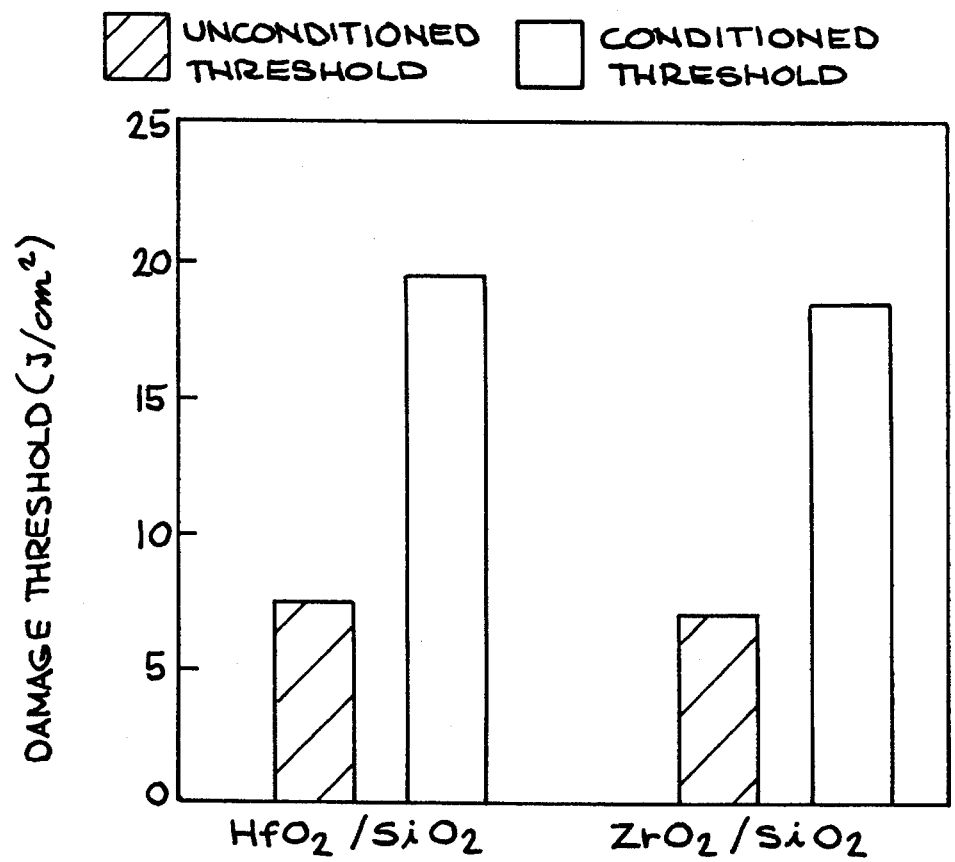
FIG. 8 is a graph of the laser damage thresholds of unconditioned coatings and conditioned coatings of different materials.

FIG. 8 compares the laser damage thresholds of unconditioned and conditioned coatings of HfO₂/SiO₂ and ZrO₂/SiO₂. The results illustrate that the laser damage threshold of various materials can be increased using the invention.

Various lengths of time can be used for applying the different steps or single steps in the inventive conditioning process.

Various laser beam diameters can be used to condition the films from fractions of a millimeter to several meters depending on the scale of the conditioning laser system.

Figure 9:
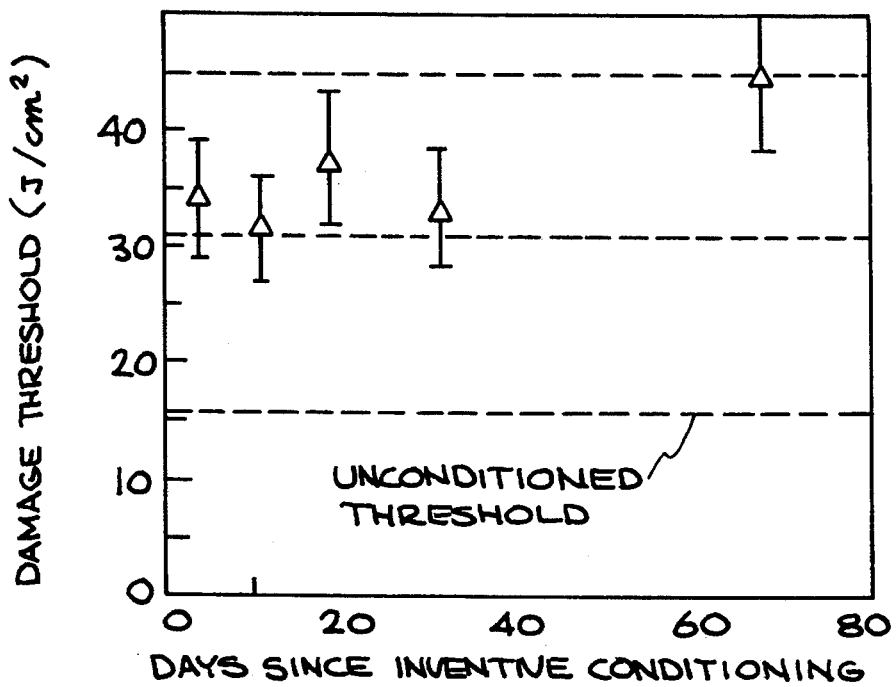
FIG. 9 is a graph of the laser damage threshold versus days since conditioning which illustrates the permanence of the invention.

FIG. 9 is a graph of the laser damage threshold for conditioned coatings measured 3, 11, 19, 31, and 68 days after the conditioning. The plot of laser damage threshold versus days since irradiation indicates that there is no decrease in the conditioned laser damage threshold over the 68 day period. This helps to prove that the inventive conditioning is permanent.

The foregoing description of preferred embodiments of the invention have been presented for purposes of illustration and description. It is not intended to be exhaustive or to limit the invention for the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of conditioning an optical coating to increase a permanent damage threshold thereof to laser radiation of a desired wavelength which comprises irradiating said coating with a laser beam in a ramp-like fashion, wherein successive irradiation steps are applied in increasingly higher fluences, each increase being substantially less than a percent of an initial damage threshold of said coating, a first irradiation step having a fluence of less than 85% of the initial damage threshold and a final irradiation step having a fluence greater, than 100% of the initial damage threshold.

2. A method as in claim 1, wherein said laser beam is passed through a ramp attenuator to regulate the fluence generated by said beam, said beam is decreased stepwise so that the fluence at a surface of the optical coating increases stepwise from the fluence of the first irradiation step to the fluence of the final irradiation step.

3. A method as in claim 2 wherein said irradiation steps are each applied at intervals less than a second.

4. A method as in claim 2 wherein said optical coating is a dielectric film.

5. A method as in claim 2 wherein said optical coating has been coated on a substrate by a deposition process.

6. A method as in claim 5 wherein said process is e-beam deposition.

7. A method as in claim 2 wherein said final irradiation step has a fluence greater than 150% of the initial damage threshold.

\* \* \* \* \*